(12) United States Patent
Guerin et al.

(10) Patent No.: US 10,157,108 B2
(45) Date of Patent: Dec. 18, 2018

(54) MULTI-WAY, ZERO-COPY, PASSIVE TRANSACTION LOG COLLECTION IN DISTRIBUTED TRANSACTION SYSTEMS

(71) Applicant: International Business Machines Corporation, Armonk, NY (US)

(72) Inventors: Xavier R. Guerin, White Plains, NY (US); Shicong Meng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 14/287,674

(22) Filed: May 27, 2014

(65) Prior Publication Data

US 2015/0347243 A1 Dec. 3, 2015

(51) Int. Cl.
| | |
|---|---|
| G06F 11/14 | (2006.01) |
| G06F 15/173 | (2006.01) |
| H04L 29/08 | (2006.01) |

(52) U.S. Cl.
CPC ........ *G06F 11/1471* (2013.01); *G06F 11/141* (2013.01); *G06F 15/17331* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,999,931 A | 12/1999 | Breitbart et al. | |
| 6,823,356 B1 | 12/2004 | Novaes et al. | |
| 8,086,566 B2 | 12/2011 | Edlund et al. | |
| 8,266,111 B2 | 9/2012 | Lin et al. | |
| 8,301,593 B2 | 10/2012 | Hoffmann et al. | |
| 8,676,851 B1 * | 3/2014 | Nesbit ............... G06F 17/30227 | |
| | | | 707/791 |
| 2002/0194015 A1 | 12/2002 | Gordon et al. | |

(Continued)

FOREIGN PATENT DOCUMENTS

| | | | |
|---|---|---|---|
| WO | WO 97/04390 | * | 2/1997 |
| WO | 2005036806 | | 10/2004 |

OTHER PUBLICATIONS

IBM, "Data Concurrency Control in Distributed Data Networks", IP.com, IPCOM000048042D, Feb. 8, 2005.*

(Continued)

*Primary Examiner* — Kevin T Bates
*Assistant Examiner* — Lesa M Kennedy
(74) *Attorney, Agent, or Firm* — Fleit Gibbons Gutman Bongini Bianco PL; Thomas S. Grzesik

(57) ABSTRACT

In various embodiments a distributed computing node in a plurality of distributed computing nodes logs transactions in a distributed processing system. In one embodiment, a set of information associated with at least one transaction is recorded in a transaction log. At least a portion of memory in at least one information processing system involved in the transaction is accessed. The portion of memory is directly accessed without involving a processor of the at least one information processing system. The set of information from the transaction log is written to the portion of memory. The set of information is directly written to the portion of memory without involving a processor of the at least one information processing system.

20 Claims, 8 Drawing Sheets

(56) References Cited

U.S. PATENT DOCUMENTS

| | | | |
|---|---|---|---|
| 2002/0199040 A1* | 12/2002 | Irwin | G06F 13/28 710/22 |
| 2003/0009432 A1* | 1/2003 | Sugahara | G06F 13/387 |
| 2006/0010130 A1* | 1/2006 | Leff | G06F 9/466 |
| 2009/0049054 A1* | 2/2009 | Wong | H04L 67/325 |
| 2010/0049718 A1* | 2/2010 | Aronovich | G06F 17/30115 707/607 |
| 2010/0082540 A1* | 4/2010 | Isaacson | G06F 11/1458 707/624 |
| 2012/0150802 A1 | 6/2012 | Popov et al. | |
| 2012/0278288 A1 | 12/2012 | Deshmukh et al. | |
| 2013/0254208 A1* | 9/2013 | Hazel | G06F 17/30336 707/741 |
| 2015/0149704 A1* | 5/2015 | Lee | G06F 9/466 711/103 |

OTHER PUBLICATIONS

Kolltveit,H., et al., "Main memory Commit Processing:The Impact of Priorities," Department of Computer and Information Science Norwegian University of Science and Technology, Mar. 2008, pp. 470-477, J.R. Haritsa, R. Kotagiri, and V. Pudi (Eds.): DASFAA 2008, LNCS 4947, Copyright Springer-Verlag Berlin Heidelberg 2008.

Wilkinson, W., et al., "Database Concurrency Control and Recovery in Local Broadcast Networks," An IP.com Prior Art Database Technical Disclosure, Dec. 31, 1981, electronic publication date Dec. 8, 2007, IP.com No. IPCOM000161107D.

Takagi, A., "Concurrent and Reliable Updates of Distributed Databases," An IP.com Prior Art Database Technical Disclosure, Dec. 31, 1978, electronic publication date Mar. 30, 2007, IP.com No. IPCOM000149078D.

* cited by examiner

MULTI-WAY, ZERO-COPY, PASSIVE TRANSACTION LOG COLLECTION IN DISTRIBUTED TRANSACTION SYSTEMS

BACKGROUND

The present disclosure generally relates to distributed processing systems, and more particularly relates to logging transactions within a distributed processing system.

Distributed transaction systems generally rely on expensive software-based control and communication layers to collect transaction logs. The control and communication layers are usually required to locally copy the intended modification of the transaction into a log, serialize this log into another memory region, and then utilize TCP/IP sockets to send this serialized data to the transactional servers. The transaction servers then de-serialize the data to execute the transaction. This conventional configuration is expensive both in memory and processing resources.

BRIEF SUMMARY

In one embodiment, a method, with a distributed computing node in a plurality of distributed computing nodes, for logging transactions in a distributed processing system is disclosed. The method comprises recording a set of information associated with at least one transaction in a transaction log. At least a portion of memory in at least one information processing system involved in the transaction is accessed. The portion of memory is directly accessed without involving a processor of the at least one information processing system. The set of information from the transaction log is written to the portion of memory. The set of information is directly written to the portion of memory without involving a processor of the at least one information processing system.

In another embodiment, an information processing system for logging transactions in a distributed processing system is disclosed. The information processing system comprises memory and a processor that is communicatively coupled to the memory. A transaction log manager is communicatively coupled to the memory and the processor. The transaction log manager is configured to perform a method. The method comprises recording a set of information associated with at least one transaction in a transaction log. At least a portion of memory in at least one information processing system involved in the transaction is accessed. The portion of memory is directly accessed without involving a processor of the at least one information processing system. The set of information from the transaction log is written to the portion of memory. The set of information is directly written to the portion of memory without involving a processor of the at least one information processing system.

In yet another embodiment, a computer program product for logging transactions in a distributed processing system is disclosed. The computer program product comprises a storage medium readable by a processing circuit of a distributed computing node in a plurality of distributed computing nodes, and storing instructions which, responsive to being executed by the processing circuit, cause the processing circuit to perform operations. These operations comprise recording a set of information associated with at least one transaction in a transaction log. At least a portion of memory in at least one information processing system involved in the transaction is accessed. The portion of memory is directly accessed without involving a processor of the at least one information processing system. The set of information from the transaction log is written to the portion of memory. The set of information is directly written to the portion of memory without involving a processor of the at least one information processing system.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Operating Environment

Figure 1:
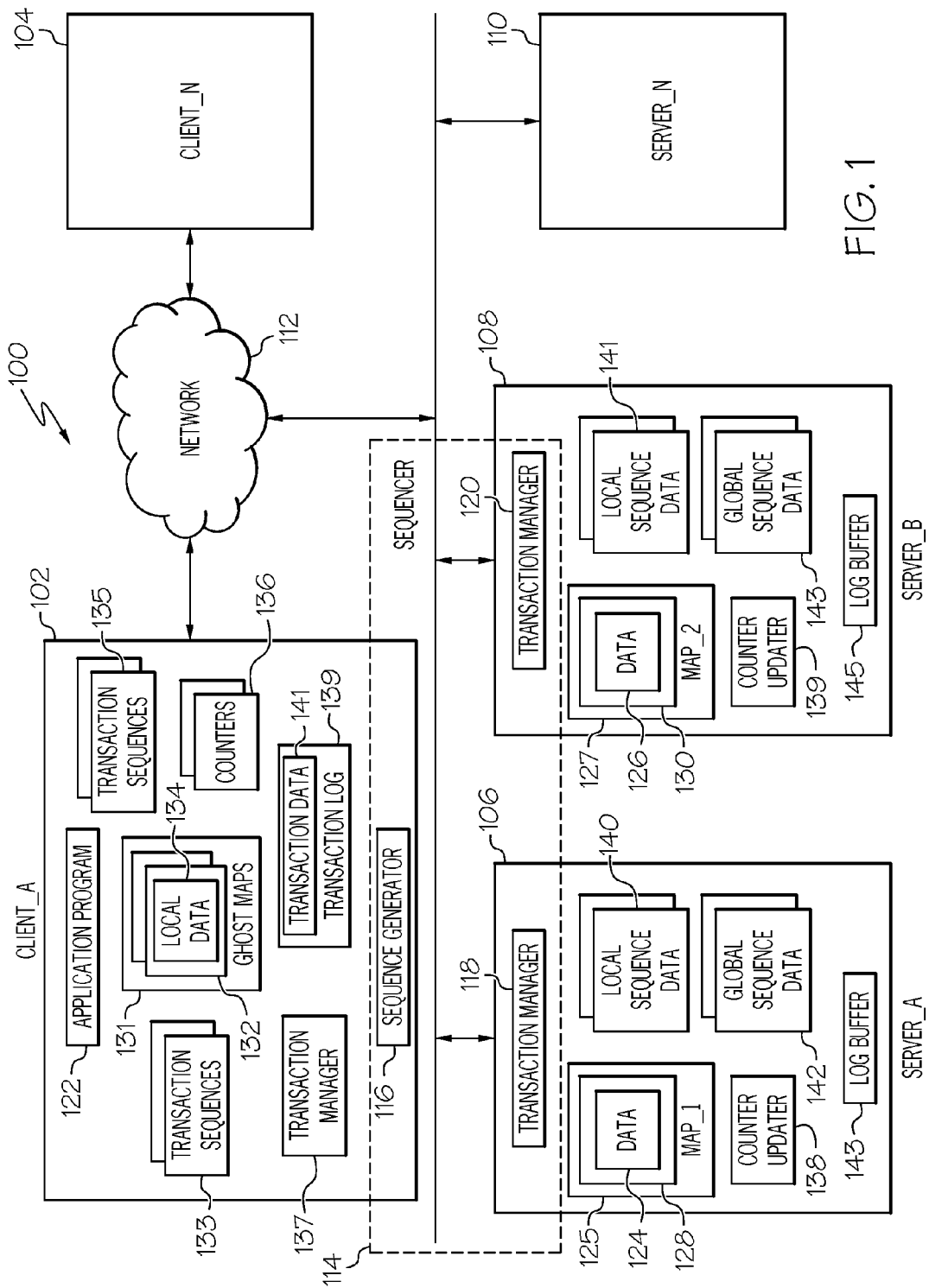
FIG. 1 is a block diagram illustrating one example of an operating environment according to one embodiment of the present disclosure.

FIG. 1 shows an operating environment 100 according to one embodiment of the present disclosure. In one embodiment, the operating environment 100 comprises a plurality of computing nodes interconnected through one or more communication networks. For example, the operating environment 100 comprises one or more client computing nodes 102, 104 that access a distributed network of computing devices such as (but not limited to) server nodes 106, 108, 110 that are connected together by one or more networks 112 such as the Internet and/or local networks.

A transaction sequencer 114 is distributed across each client 102, 104 and server 106, 108, 110 in the distributed operating environment 100. The sequencer 114, in this embodiment, comprises a sequence generator 116 residing at each of the clients 102, 104 and a transaction manager 118, 120 residing at each of the servers 106, 108, 110. As will be discussed in greater detail below, the sequencer 114 utilizes hardware-accelerated remote direct memory access (RDMA) operations to sequence and schedule two-phase commit transactions. By utilizing RMDA, the need for intermediate live two-phase commit entities is avoided. Stated differently, the distributed sequencing process performed by the sequencer 114 for a transaction T involves only the servers/partitions that are relevant to T rather than involving all servers in the system. This drastically reduces latencies and computing resource usage, and also increases the scalability of the distributed transactional engine.

Each client 102, 104 comprises one or more application programs 122 that request transactions on data 124, 126, which is distributed across the servers 106, 108, 110. In one example, the data 124, 126 maintained by each server 106, 108, 110 resides in a portion of memory or other storage area of the server. In one example, the data 124, 126 resides in a portion 125, 127 (e.g., a partition, shard, etc.) of a database distributed across the servers 106, 108, 110. A key-value store (KVS), in one embodiment, can be used to maintain the data 124, 126. A KVS writes a value by associating a key to the value and reads a value by specifying a key associated with the value. In this embodiment, the data 124, 126 is maintained within a map 128, 130, which is a data structure that stores pairs of keys and values. When given a key, a map 128, 130 can locate the corresponding entry that includes its paired value.

When a KVS is implemented, one or more of the servers 106, 108, 110 is a catalog server that maintains partition/map information for the database data. Stated differently, the catalog server stores information that allows that application program 122 to identify the servers 106, 108, 110 on which a given set of data 124, 126 is stored. It should be noted that embodiments of the present disclosure are not limited to distributed databases and key-value stores. Embodiments of the present disclosure are applicable to any type of system and data on which two-phase commit transactions can be performed.

Each client 102, 104 also comprise an area of memory 131 (or storage) that maintains a working (local) copy 134 of data the 124, 126 maintained by the servers 106, 108, 110 required by the corresponding transaction. In one embodiment, the working copy 134 is stored within a data structure referred to as a "ghost map 132" for each transaction requested by the application program 122. During an updating stage of the transaction, the application program 122 performs one or more operations of a transaction on the working copy 134 of data as compared to the original data 124, 126 stored at the servers 106, 108, 110. A client 102, 104 further comprises a transaction execution sequence 133 generated by the sequence generator 116 for each transaction requested by the application programs 122. As will be discussed in greater detail below, the transaction sequence 133 orders/sequences its corresponding transaction with respect to other transactions being executed on the servers relevant to the transaction.

The clients 102, 104 further comprise a transaction ID generator 135 that generates a unique identified (ID) for each transaction requested by the application program 122. The clients 102, 104 also maintain various counters 136. For example, a client maintains a SUCCESS counter, which tracks the successful locking of data 124, 126 for a transaction at its server 106, 108, 110, and a FAILURE counter, which tracks locking failures for transaction data 124, 126.

In one embodiment, each client 102, 104 comprises a transaction log manager 137. [The transaction log manager 137 maintains a transaction log 139 at its client 102, 104. In this embodiment, the transaction manager 137 stores log data 141 (e.g., the operations, the data on which the operations were performed, and/or the results of performing the operations) within the log 139 for each transaction performed at the client 102 104. For example, the transaction manager 137 stores one or more log entries within the log 139 for each transaction. This log entry comprises, for example, the sequence number of the corresponding transaction and the local transactional workspace (e.g., the local data 134 within the ghost map 132) after one or more operations have been applied thereon. In an embodiment implementing a KVS, an entry within the log 139 comprises the write set (all modified key-value pairs) and the result set (commit or abort) of the transaction. Log data 141 can also comprise read sets as well. For aborted transactions, the corresponding log entry can maintain just the sequence number and the result without the write set. Entries for aborted transactions are maintained to provide continuous sequence numbers so that locking services can process the logs just as new workloads without modification. It should be noted that in one embodiment, a separate transaction log 139 is not required. In this embodiment, the ghost map 132 is the transactional log and the local data 134 is the log data 141. It should also be noted that, in one embodiment, the sequence generator 116 and the transaction log manager 137 are part of the same component.

As will be discussed in greater detail below, the transaction log manager 137 is allocated a portion of memory/storage on the servers 106, 108 involved in a transaction. For example, the transaction log manager 137 is allocated at least a portion of a log buffer 143, 145 maintained at the servers 106, 108. The transaction log manager 137 directly writes the transaction log data 141 associated with a given transaction into its allocated portion of the log buffer 143, 145. It should be noted that, in some embodiments, this direct write operation is performed without involving the software stack and/or the processor(s) of the servers 106, 108. For example, the transaction log manager 137 directly writes log data 141 for a transaction into its allocated portion of the log buffer 143, 145 on the servers 106, 108 utilizing hardware-accelerated remote direct memory access (RDMA) operations such as an RDMA write. In this embodiment, the transaction log manager 137 comprises an RDMA engine/adapter. In an alternative embodiment, the client 102 comprises a separate RDMA engine/adapter. In this embodiment, the transaction log manager 137 sends the log data 141 to the RDMA engine/adapter and programs the RDMA engine/adapter to directly write the log data 141 to the log buffer 143 of the servers 106, 108. Once stored, the servers 106, 108 use the log data 141 to update/modify the original copy 124, 126 of the transaction data accordingly.

The servers 106, 108, 110 each comprise a counter updater 138 that sends lock status information to the clients 102, 104. The clients 102, 104 utilize this lock status information to update their counters 136. Local sequence data 140 and global sequence data 142 are also maintained by each server 106, 108, 110. The local sequence data 140 identifies the next available transaction ID on the server. The global sequence data 142 comprises transaction sequence information for the other servers in the distributed processing system. In one embodiment, the local and global sequence datasets 142, 144 are maintained by one or more counters.

In one embodiment implementing maps 128 to maintain and manage data 124 at the servers 106, 108, 110, each partitioned map can be backed by a single server node or multiple server nodes through active replication. Active replication, in one embodiment, is achieved by letting each replica independently execute the same workload, since deterministic parallelism ensures all replicas reach the same state given the same input workload. In some instances, replica servers may progress at different speeds. To address this issue, a primary replica is selected for each partition, and the client node commits its transaction to that primary replica. The primary replica checks the validity of the transaction and waits for the success of the other servers involved in the transactions. The primary replica then asks its secondary replica to execute the transactions and, when all secondary replicas successfully execute the transaction the primary replica executes the transaction itself.

Passive Two-Phase Commit for Transactions

In one embodiment, the application programs 122 utilize a two-phase commit protocol to perform their transactions. A two-phase commit protocol coordinates multiple servers/nodes 106, 108, 110 to perform a single atomic transaction. Atomicity in a computing system is frequently required to guarantee that a series of interdependent transactions are either all performed successfully or all canceled successfully. That is, an atomic transaction either occurs completely, or not at all, but should never occur in part. The servers 106, 108, 110 only commit their respective steps if all the servers in the group are able to commit their steps. If one or more of the servers 106, 108, 110 cannot commit (fail), then each server undoes whatever steps were perfumed.

As discussed above, conventional two-phase commit techniques generally require substantial communication overhead. These techniques usually result in high latency, increased data contention, and distributed deadlocks. However, embodiments of the present disclosure avoid and overcome the disadvantages of conventional two-phase commit techniques by distributing the sequencer 114 across the client's 102, 104 and the servers 106, 108, 110, which avoids the need for intermediate live two-phase commit entities. This drastically reduces latencies and computing resource usage, and also increases the scalability of the distributed transactional engine.

Figure 2:
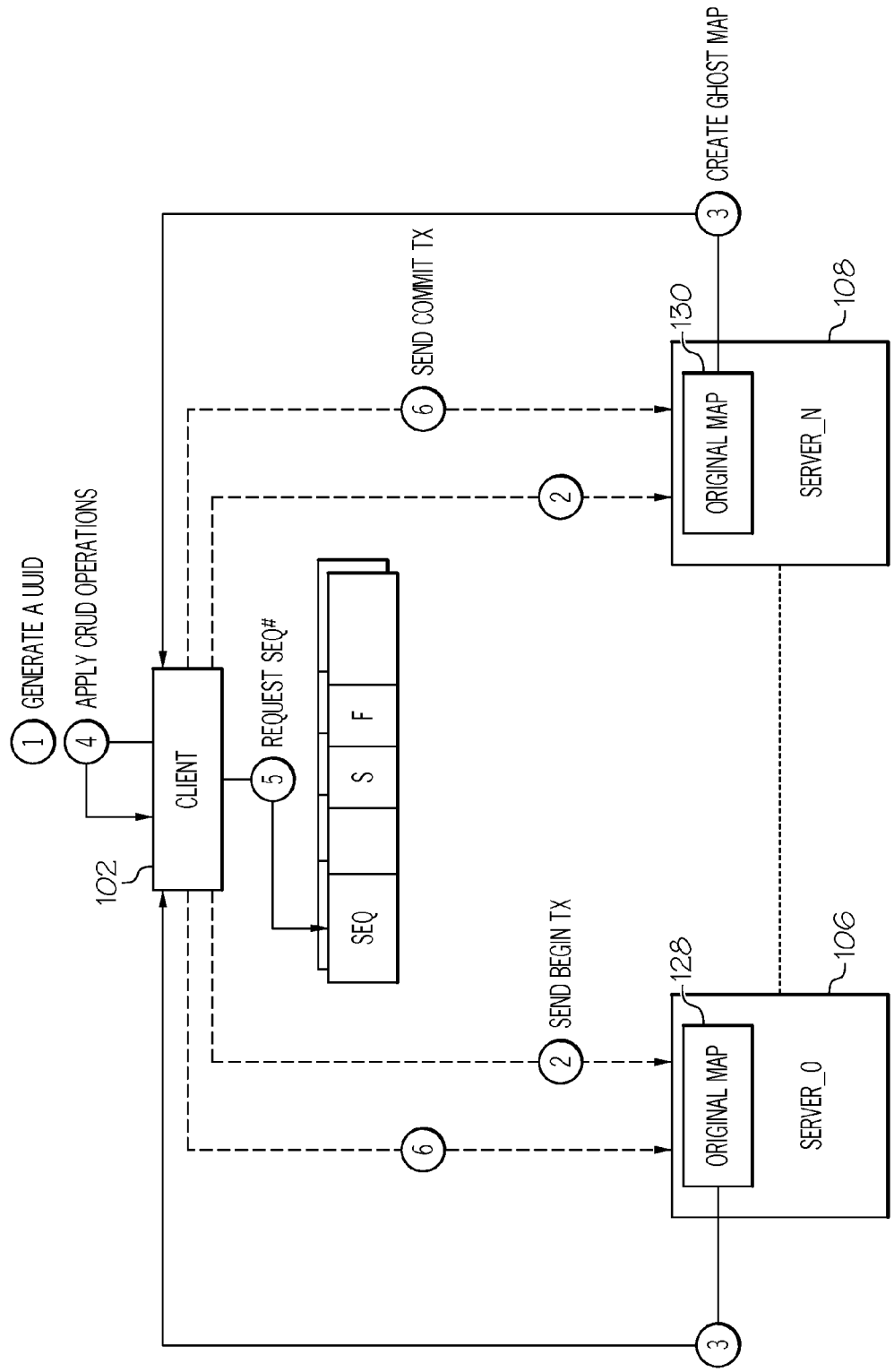
FIG. 2 is a transactional diagram illustrating one example of generating a transaction execution sequence for a distributed computing environment according to one embodiment of the present disclosure.
Figure 3:
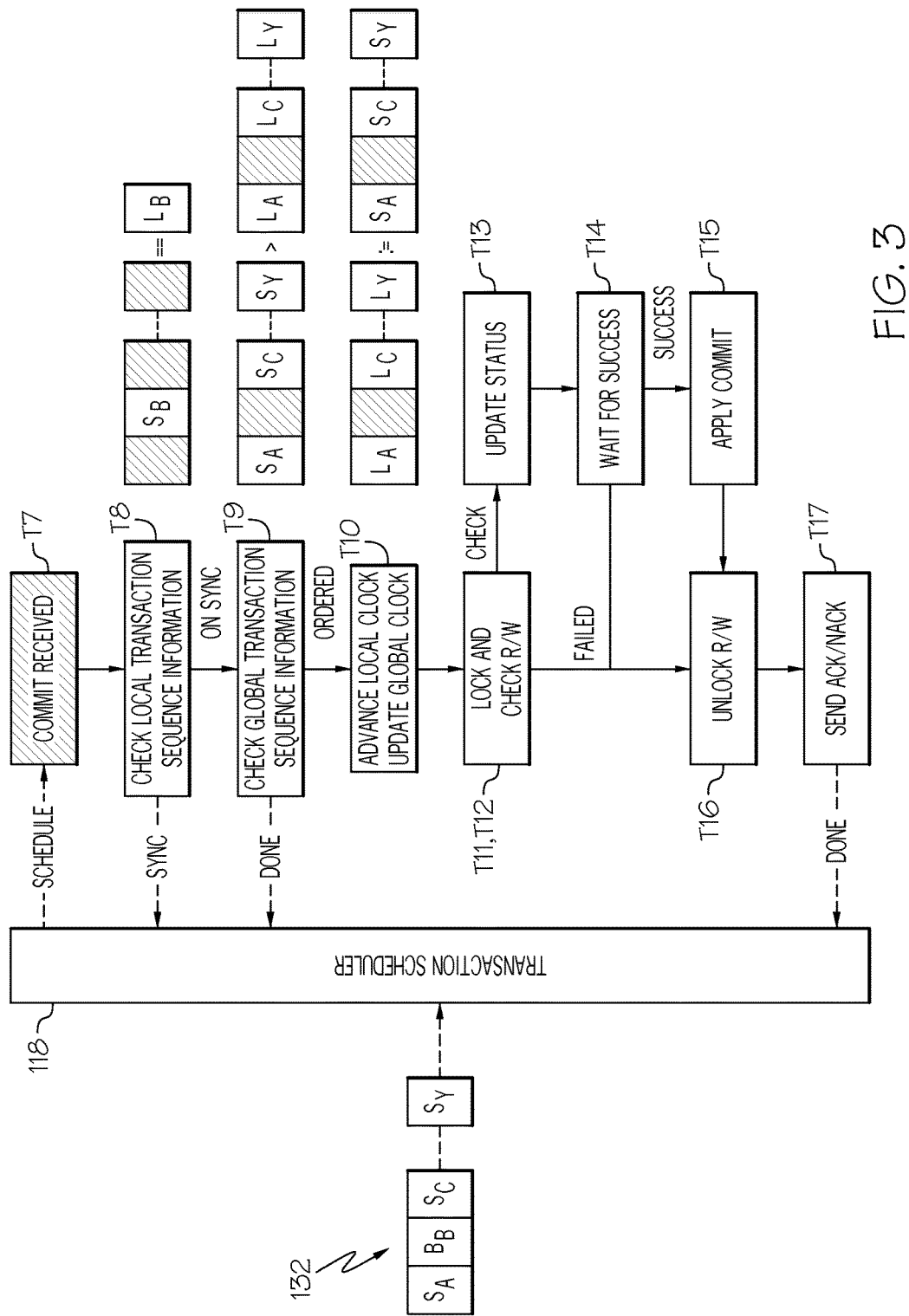
FIG. 3 is a transactional diagram illustrating one example of executing a transaction in a distributed computing environment based on a transaction execution sequence associated with the transaction according to one embodiment of the present disclosure.

Referring now to FIGS. 2 and 3, these figures provide transactional diagrams illustrating an overall process for performing a transaction utilizing the passive two-phase commit protocol of one or more embodiments. In particular, FIG. 2 shows a transactional diagram for generating transaction sequences and FIG. 3 shows a transactional diagram for committing the transaction based on the generated transaction sequences. In one embodiment, the transaction ID generator 135 (or application 122) generates a system-wide unique transaction identifier (UUID) for a transaction, at T1. In this embodiment, when the application program 122 wants to perform a global transaction on a given set of data 124, 126, the application program 122 identifies the servers 106, 108, 110 on which this data 124, 126 resides. For example, if the servers 106, 108, 110 are implementing a KVS the application program 122 analyzes database partition information obtained from a catalog server. The application program 122 identifies the IDs of the servers 106, 108 on which the given set of data 124, 126 is stored based on the partition information. Once the application program 122 has identified the servers 106, 108 it sends a transaction request to each of these servers, at T2. This transaction indicates that the transaction is starting and comprises at least the UUID of the transaction. Other information such as a client ID, local time, etc. can also be included within this transaction request.

The application program 122 obtains a copy 134 of the data 124, 126 required for the transaction from each of the identified servers 106, 108, and stores this working copy 134 in a local ghost map 132, at T3. In one embodiment, the client node 102 utilizes RDMA to issue read commands to the servers 106, 108 for read results in the ghost map 132. However, the client node 102 is able to write results in the ghost map 132 without involving the server. In an example implementing a KVS the data stored within a ghost map 132 only comprises the key-value pairs read/written by the transaction. The application program 122 associates the UUID of the transaction with the ghost map 132. The application program 122 creates a separate ghost map 132 for each of its transaction. In another embodiment, each of the servers 106, 108 generate a ghost map with a working copy of the data 124, 126 accessed by the transaction based on receiving the transaction request from the client node 102. In this embodiment, the servers 106, 108 associate the transaction UUID with each of the ghost maps generated for the transaction.

In another embodiment, each of the servers 106, 108 stores their data 124, 126 according to the system discussed in the commonly owned U.S. application Ser. No. 13/683, 319, now U.S. Pat. No. 9,378,179, entitled "RDMA-OPTIMIZED HIGH-PERFORMANCE DISTRIBUTED CACHE", filed on Nov. 12, 2013 which is hereby incorporated by reference in it entirety. In this embodiment, the data 124, 126 is stored in large pre-allocated and pinned/registered memory pages. For each data entry 124, 126 that is added to the memory/storage 125, 127, a unique handle is created that identifies the corresponding memory page and the entry's offset on the page. For example, a unique metadata is created that comprises information about the location of the entry in the server's memory store and the version of the key. The handles/metadata are remotable and can be used to access the data 124, 146 from outside of the server via an RDMA network adapter. A server 106, 108 contiguously stores the key and value of an entry in a memory region allocated by an RDMA-aware store. The key also includes a unique version number, which is equivalent to the one stored in its metadata. The server stores the handles in a hash map that is keyed by the entry's key. The servers 106, 108 publish the hashmap to each of the clients 102, 104.

At startup, the client 102, 104 starts with an empty metadata hash map. The client's metadata hash map acts as a local metadata cache. The client 102, 104 uses its metadata hash map to locally look up and obtain a copy the remote data 124, 126. For example, the application 122 of the client 102 looks up the metadata of transactional data by its key from the local metadata hash map. The metadata map returns a set of potential matches, where the matching is performed using hash codes. For each metadata in the match set, the application 122 allocates a memory region of the size of the entry to read. The application 122 performs an RDMA read to directly read the transactional data 124, 125 from the memory/storage 125, 127 of the involved servers 106, 108. The application 122 checks if the key of the transactional data matches the key passed by the application 122. If the keys are identical, the application 122 matches the version number in the entry's key with the version number stored in its metadata. If the versions match, the key is valid and the value is returned to the application 122. If the versions are different, the metadata is stale and removed from the client's metadata cache. If no key was matched, the application 122 packs the key in a message and sends an active request to the server 106, 108 for the value. Upon reception on this active message, the server 106, 108 returns the entry's metadata and the value of the key is found.

After the application 122 has created a working copy 134 of the transaction data, the application program 122 performs one or more create/retrieve/update/delete (CRUD) operations on the working copy 134 of the data in the corresponding ghost map 132, at T4 (updating stage). If any problems/errors occur while these operations are being performed the application aborts the transaction. Also, if the ghost maps were created at the servers 106, 108 the application program 122 notifies the servers 106, 108 to clean up their ghost maps.

After the application program 122 has successfully performed its operations on the working copy 134 of the transaction data 124, 126, sequencing operations are performed to sequence and order the transaction with respect to other transactions in the distributed system, at T5 (sequencing stage). In this embodiment, the sequencer 114 provides continuous, monotonically increasing sequence numbers for all transactions. For example, the sequence generator 116 of the sequencer 114 uses a single thread to assign sequence numbers to new transactions. The sequence generator 116 creates an in-memory entry that comprises a transaction sequence (TSEQ) assigned to the transaction and two atomic counters 136 (one (S) for successful locking and the other (F) for failed locking). Both counters are initially set to 0. As will be discussed in greater detail below, a transaction sequence 133 comprises a sequence number (SEQ) for each of the servers 106, 108 involved in the transaction. These sequence numbers order the execution of the transaction on the involved servers with respect to other transactions scheduled/executing on the servers.

In one embodiment, the sequence generator 116 utilizes a passive vector clock technique to provide system-wide distributed transactional sequencing, where the computation of the sequence number is done using RDMA without involving the remote server's processor(s). In this embodiment, the sequence generator 116 orders distributed events (i.e., committing of distributed transactions) with partial vector clocks supported by passive remote memory operations. The distributed sequencing process performed by the sequence generator 116 for a transaction T involves only the servers/partitions that are relevant to T rather than involving all servers in the system.

For example, the sequence generator 116 sends a sequence number request via one or more RDMA operations (such as a fetch and add operation) to each of the servers 106, 108 involved in the transaction. The sequence number request, via RDMA, reads the current transaction sequence number from each of the involved servers' local sequence data 140 and sends this sequence number to the client node 102. In this embodiment, the local sequence data 140 of a transactional server i (involved server) is comprised of two counters in memory, an available sequence ID counter with a value $S_i$ and a current transaction ID counter with a value $L_i$. The $S_i$ value represents the next available transaction ID on server i. The $L_i$ value represents the current transaction ID on the server i. The sequence number request reads the current $S_i$ value and increments the $S_i$ value by 1. The $S_i$ value read by the sequence number request is then sent to the client node 102.

In particular, let P(T) denote the set of servers (partitions) $P_i$ that own the data accessed by transaction T. The sequence generator 116 sequentially collects $S_i, i \in P(T)$, in ascending order, either synchronously or asynchronously. The collection is performed by remotely and atomically reading and incrementing the local $S_i$ value/number of the involved servers P(T). This process leverages hardware-implemented RDMA atomic operations, which is highly efficient and requires no participation by the involved servers P(T). For example, the client node 102 invokes a Fetch-and-Add atomic RDMA operation on the server-side counter, which returns the current counter value and increments the counter value atomically. The read S value is sent to the sequencer generator 116, which binds the $S_i, i \in P(T)$ together into a transaction sequence (also referred to herein as a "transaction timestamp") of the following form:

$$\{S_{i_1}, S_{i_2}, \ldots, S_{i_k}\} \text{ where } i_1 < i_2 < \ldots < i_k \text{ and } i_1, i_2, \ldots, i_k \in P(T).$$

For example, consider a set of servers (P(T)) $P_A$, $P_B$, $P_C$, ..., $P_k$ involved in a transaction T. Server $P_A$ has a current transaction ID ($L_A$) of 0 and a next available transaction ID ($S_A$) of 4. In other words, server $P_A$ is currently executing a transaction with a transaction ID of 0 and has transactions with IDs 1-3 waiting in a queue to be executed. Server $P_B$ has a current transaction ID ($L_B$) of 1 and a next available transaction ID ($S_B$) of 10. Server $P_C$ has a current transaction ID ($L_C$) of 2 and a next available transaction ID ($S_C$) of 5. Server $P_K$ has current transaction ID ($L_K$) of 7 and a next available transaction ID ($S_K$) of 20. The $S_i$ and $L_i$ values of each server may not be the same since multiple transactions can be executing concurrently and each server may be involved in different transactions at any given time. The sequencer 114 utilizes RDMA operations to read the current $S_A$, $S_B$, $S_C$, ..., $S_K$ values of from servers $P_A$, $P_B$, respectively and increment each of these values by 1.

The sequence generator 116 combines the read $S_A$, $S_B$, $S_C$, ..., $S_K$ values into a transaction sequence 133 comprising an entry field for each of the servers $P_A$, $P_B$, $P_C$, ..., $P_k$ involved in the transaction T. Each entry field comprises a sequence number (SEQ) of the transaction T for the associated server. In the current example, the transaction sequence 133 for transaction T is $S_A$, $S_B$, $S_C$, ..., $S_K$ where $S_A=4$, $S_B=10$, $S_C=5$, and $S_K=20$. This transaction sequence 133 orders the operations of transaction T at each server $P_A$, $P_B$, $P_C$, ..., $P_k$ with respect to the operations of other transactions. In one embodiment, the transaction sequence 133 is generated after the execution of the transaction (in the updating stage where the application program 122 performs operations on the working copy 134) because lock acquiring is performed in strict order and transaction execution time may vary heavily. Acquiring sequence numbers at before or during the updating stage can cause the entire system to wait for a slow transaction to finish.

Once the sequence generator 116 has generated the transaction sequence 133 for the transaction T, the sequence generator 116 packs the transaction sequence 133 sequence with a COMMIT message and sends the COMMIT message to the involved servers (e.g., $P_A$, $P_B$, $P_C$, ..., $P_k$) either synchronously or asynchronously, at T6. The COMMIT message comprises the transaction sequence 133, the working copy 134 of the transaction data 124, 126, and the UUID of transaction T. If the working copy 134 is maintained within a ghost map 132, the ghost map 132 is also sent as part of the COMMIT message. In another embodiment, the transaction log 137 is sent instead of the working copy 134. However, in other embodiments, the working copy 134 acts as the transaction log 137. It should be noted that in these embodiments, the transaction log 137 is sent to the servers 106,108 separately from the COMMIT message. However, in other embodiments, the transaction log 137 is sent to the servers 106, 108 as part of the COMMIT message. The transaction log 137 is discussed in greater detail below.

FIG. 3 shows that each server $P_i$ involved in the transaction T receives the COMMIT message comprising the transaction sequence 133, at T7. The transaction manager 118 of each server $P_i$ utilizes the transaction sequence 133 to order the execution of transaction operations on the server. For example, on a server $P_i$, the transactions are ordered according to the SEQ value in the entry field $C_i$ of the transaction sequencer 132 corresponding to the server's ID i. In the current example, $C_A$ for server $P_A$ comprises SEQ value $S_A$; $C_B$ for server $P_B$ comprises SEQ value $S_B$; $C_C$ for server $P_C$ comprises SEQ value $S_C$; and $C_K$ for server $P_K$ comprises SEQ value $S_K$.

The transaction manager 118 of server $P_i$ checks its global transaction sequence information (local clock) 140, at T8. For example, the transaction manager 118 compares the entry field $C_i$ for its server in the transaction sequence 133 to the $L_i$ value of the server. If $C_i=L_i$, the transaction proceeds. However, if $C_i \neq L_i$ the transaction is delayed at the server until $C_i=L_i$. For example, if $L_B$ for server $P_B$ is 1 and $S_B$ for server $P_B$ is 10 the operations for transaction T on server $P_B$ is placed in a queue until $L_B=10$ (i.e., the operations for transactions 1-9 are performed on server $P_B$). The transaction manager 118 of each server $P_i$ stores the SEQ value from its corresponding entry field $C_i$ of the transaction sequence 133 in the local sequence data 140 of the server.

A server $P_i$ also maintains global sequence data 142. In one embodiment, the global sequence data 142 is an array $M_i$ that comprises the latest transaction sequence entry fields $C_i$ of other servers observed in previous transactions. The transaction manager 118 of a server $P_i$ updates its global sequence data 142 as the server executes new transactions. Once $SEQ_i=L_i$, the transaction is the only transaction to be executed on the entire server until $L_i$ is incremented, which occurs after the read/write sets are locked. During this grace period, the transaction manager 118 of server $P_i$ checks if the other fields of the transaction sequence 133 are strictly higher than their counterparts in $M_i$, at T9. If the other fields $C_i$ of the transaction sequence 133 are strictly higher than their corresponding values in $M_i$ the fields in $M_i$ are updated with the values found in the transaction sequence 133, at T10. For example, the transaction manager 118 at server $P_B$ determines if the values of $S_A$ (4), $S_C$ (5), . . . , $S_k$ (20) in the entry fields $C_A$, $C_C$, . . . , $C_K$ of the transaction sequence 133 are higher than the current values of $S_A$, $S_C$, . . . , $S_k$ in $M_B$. If so, the transaction manager 118 of server $P_B$ stores the values of $S_A$ (4), $S_C$ (5), . . . , $S_k$ (20) from the received transaction sequencer 132 in $M_B$. If one of the fields of the transaction sequence 133 is not strictly higher than its corresponding value in $M_B$, each value in $M_B$ is incremented by 1 and the transaction is aborted. It should be noted that in an embodiment implementing replicas, the sequencing stage discussed above is the same. For example, the sequencer 114 forwards the commit request to all replicas.

After the transaction manager 118 of server $P_i$ has updated the global sequence data 142, the manager 118 sets read/write locks for the data 124, 126 required by the transaction T, at T11 (locking stage). For example, the transaction manager 118 identifies the working copy 134 of the data 124, 126 or transaction log 137 associated with the transaction T via the transaction's UUID. In one embodiment, the working copy 134 or transaction log 137 is transferred onto the servers 106, 108 by the client node 102 utilizing one or more RDMA write operations. The transaction manager 118 then requests the server's internal locking service to lock the original data 124, 126 maintained by the server $P_i$. The locking service ensures sequential consistency of transaction execution by acquiring locks for transactions based on the order established by the transaction sequences received by the server $P_i$.

In one embodiment, the locking service uses a single thread to acquire locks. The lock acquiring thread maintains the largest SEQ value (SEQ*) from the previously observed transaction sequences 133. In this embodiment, the locking thread acquires locks for the transaction with a sequence number SEQ*+1. In the example above, the locking thread of server $P_B$ acquires a lock for the transaction with a SEQ value of $S_B=10$ when SEQ* is equal to 9. This ensures that locks are acquired strictly based on the transaction sequence number, guarantees sequential consistency. The locking services utilize a linked list to store locking requests of different transactions where requests are ordered by the transaction SEQ value. Since the arrival of locking requests may not be the order of their sequence number due to the non-deterministic nature of operating system event scheduling and communication, the locking service may need to wait for a small period of time for the next transactions. This waiting time, however, tends to be fairly small, because the sequencing process itself is quite short and the corresponding timing differences are also small.

In an embodiment where the transaction data 124, 126 is a key-value pair k, the locking service first checks if there are existing locks on the server $P_i$. If no such locks exist, the locking service acquires the lock for the key-value pair k. Otherwise, the locking server adds the lock request to a pending lock queue indexed by the map key, denoted by $Q_p$. An entry of $Q_p(k)$ is a heap of all locking requests on the key-value pair k where the request with the smallest SEQ value is on the top. When a lock on a key-value pair k is released, the locking service checks if the corresponding entry on $Q_p(k)$ is empty. If not, the locking service acquires the lock for the top request. The locking service also checks if a transaction has acquired all its locks after serving a locking request, where each data item on the server that is read or updated by the transaction is associated with a lock. If so, the transaction enters the commit stage of the two-phase commit protocol, at T12. If all locks have not been acquired the transaction wits until all the locks are acquired before it can be executed. It should be noted that in an embodiment implementing replicas only primary replicas of different partitions send their checking results.

During the commit stage of transaction T, the transaction manager 118 of server $P_i$ first checks whether the read results stored in the working copy 134 of the data or transaction log 137 are the same as those stored in the original data 124, 126 at the server $P_i$, at T13. Such differences are possible because between the start of the transaction where the client 102 performs its operations on the working copy 134 and the end of the locking stage of the transaction T, there may be another transaction T' that commits and changes the value of data items read by the transaction T. When this occurs, the transaction manager 118 aborts the transaction T since it conflicts with the sequential consistency (a transaction should observe the most recent values committed by its immediate precedent transaction).

However, as transaction T is independently executed on partitioned servers, all servers must reach a consensus on whether such differences exist so that they can all commit or abort. To reach a consensus, each server $P_i$ sends a message to the sequencer 114 to indicate its checking results where success means no difference is detected and failure indicates otherwise. The sequencer 114 uses these messages to update the two counters, SUCCESS and FAILURE, at T14. If SUCCESS=N where N is the total number of containers involved in transaction T, the sequencer 114 indicates that all checking succeeds, and all containers should go ahead and commit transaction T, at T15. It should be noted the behavior of a transaction T can be modeled by a deterministic state machine where the input is the read results and its output (updates) does not change if its input is the same. If SUCCESS<N and FAILURE>0, all servers $P_i$ abort T since as at least one server $P_i$ detects changes in read results.

The use of two counters SUCCESS and FAILURE enables the sequencer 114 to distinguish between checking failure and communication failure. For example, consider if only one counter SUCCESS was used to indicate the number of servers $P_i$ whose checking succeeds. Then if SUCCESS<N, one could not determine if this is caused by the checking on at least one servers $P_i$ failing or at least one servers $P_i$ failing to deliver its checking result. Since the latter case cannot be ruled out, a timeout would need to be used to reach consensus, which is prohibitively expensive to use on a frequent basis. However, with SUCCESS and FAILURE counters, the sequencer 114 can timeout if the situation SUCCESS<N and FAILURE=0 lasts sufficiently long, and set FAILURE>0 so that all servers $P_i$ can unanimously abort.

In one embodiment, the transaction manager 118 of each server $P_i$ periodically polls the values of SUCCESS and FAILURE from the sequencer 114 with an RDMA read. To prevent servers $P_i$ from observing inconsistent results on the two counters, the sequencer 114 combines the two counters into a single integer and uses atomic instruction compare-and-swap to update these counters together. If the consensus result is abort, the transaction scheduler 118 releases all locks associated with T through its local locking service and cleanups the ghost map associated with T, at T16. If the result is commit, the transaction manager 118 replaces entries in the main map 128 with the corresponding ones in the working copy 134 or transaction log 137 before releasing locks and cleaning up the ghost map, at T16. The transaction manager 118 then notifies the client node 102 whether the transaction was executed successfully or failed to execute, at T17. It should be noted that in an embodiment implementing replicas both primary and secondary replicas poll the sequencer for the consensus result. Since both primary and secondary replicas observe the same results they can independently perform commit/abort in the committing stage.

It should be noted that a transaction abort only suggests that the read of the client-side execution does not follow the sequential consistency. The behavior of committed transactions is still deterministic. The transaction manager 118 can handle aborts in various ways. For example, the transaction manager 118 can abort a transaction and resubmit the job later. The transaction manager 118 can also to re-execute the transaction while holding the locks. However, this cannot completely rule out read-write set changes since the complete set of required lock is not known until all reads finish. For example, consider a scenario where key-value pairs include the next key-value pair to read or NULL (no more reads needed) with a reasonable assumption that a transaction has a finite set of read-write pairs. In this scenario, a transaction is guaranteed to eventually lock all its read-write set with the above approach, but it may detect inconsistency of read-write set every step of the way (finding the next set of key-value pairs to read/write) due to concurrent modifications. When there are only a fixed number of precedent transactions of T, the concurrent modification reduces quickly as these precedent transactions commit. However, discovering read-write set while holding locks is very expensive. Recall that the locking service processes locking requests of different transactions sequentially. Until its immediate precedent transaction finishes its locking process (with the full discovered set of locks), a transaction usually cannot start to acquire locks.

In one embodiment, server-side timeouts can be used to avoid clock skewness and racing related issues. However, various events can cause inconsistencies, e.g., different parts of the system do not observe the same events. For example, if serer $S_A$ timeouts and aborts T, server $S_B$ sends in its delayed successful checking result which makes SUCCESS=FAILURE. Server $S_C$ would then observes SUCCESS=N and commit. Once the sequencer 114 obtains the consensus result (commit or abort), it can notify the client 102 about the result without waiting for the server to finish the commit. This does not affect the consistency of the system during failures because replications and recovery allow the system to deterministically reach the same map state with the consensus result (more details of replication and recovery later).

Transaction Logging

As discussed above, one or more embodiments generate a transaction log 137 for each transaction. The transaction log 137 comprises log data 141, which is data resulting from the application 122 performing one or more transactional operations on the working copy 134 of data. In some embodiments the transaction log 137 is separate from the ghost map 132 and the log data 141 is separate from the working copy 134 of data. However, in other embodiments, the ghost map 132 acts as the transactional log and the working copy 134 of data acts as the log data 141.

In one embodiment, the transaction log manager 137 logs transaction input rather than the transaction output. Therefore, logging can be performed outside the system and removed from the critical execution path. For instance, one or more embodiments can implement server-side logging and/or client-side logging. With respect to server-side logging, a server independently logs the ghost map content after receiving the commit request, but in parallel with the locking/committing stages. Recoverability is guaranteed by having the logging process finish before the sequencer 114 notifies the application 122 of a transaction commit/abort.

With respect to client-side logging, the transaction log manager 137 starts to log a transaction during the updating stage. In this embodiment, the transaction log manager 137 records all transactions operations (e.g., create/retrieve/update/delete (CRUD) operations) being performed on the working copy 134 of data. For example, in an embodiment implementing a KVS, the transaction log manager 137 records all read and write results in parallel with accessing the ghost map 132. Similarly, to ensure recoverability, the transaction finishes logging before reporting transaction commit/abort to user applications 122. The client-library-side logging of one or more embodiments, removes a large amount, if not all, the logging overhead from the transaction execution system. It should be noted that the transaction log manager 137 is not limited to being implemented within the passive two-phase commit system discussed above.

In one embodiment, a portion of the log buffer 143, 145 in each server 106, 108 involved in a transaction is allocated to the client 102, 104. For example, when a client 102 establishes a connection with the servers 106, 108 for the transaction (e.g., when the transaction message is sent by an application program 122), the server 106, 108 pre-allocates a portion of its memory/storage for this connection. In one embodiment, this pre-allocated memory/storage is an area within the log buffer. The pre-allocated memory/storage, in one embodiment, is private to this connection and is only accessible by the client 102 performing the transaction.

As the application program 122 performs one or more transaction operations (e.g., CRUD operations) on the local data 134 stored within a ghost map 132 the transaction log manager 137 stores corresponding log data 142 within the transaction log. In one embodiment, the log data 141 comprises, for example, the UUID associated with the transaction, the data associated with the transaction, and the operations that were performed on the data. In another example, the transaction log can also comprise the data resulting from performing the transaction operations on the local data.

Once the application program 122 has completed performing transactional operations on the local data 134, the transaction log manager 137 directly accesses the log buffer 143, 145 at each of the involved severs 106, 108, and directly stores/writes the corresponding log data into its allocated portion of the log buffer 143, 145. The transaction log manager 137 accesses the log buffer 143, 145 and performs the direct write operation without involving the software stack and/or the processor(s) of the involved servers 106, 108. In one embodiment, transaction log manager 137 performs one or more RDMA operations to directly write the log data into the log buffer. For example, the transaction log manager 137, in one embodiment, retrieves/scans the log data 141 and stores this data in a data structure. In embodiments where the ghost map 132 acts as the transactional log, the local data 132 on which transactional operations were performed is stored in this data structure as log data 141. If the log data 141 is stored in non-continuous blocks of memory, the transaction log manager 137 performs a scatter/gather operation. The scatter/gather operation obtains the log data from the non-continuous blocks of memory and stores the data in a scatter/gather list.

In one embodiment, after the log data has been retrieved the transaction log manager 137 checks the size/capacity of the portion of the log buffer 143, 145 allocated to the client. If the allocated portion of the log buffer 143, 145 is able to store all of the log data for the transaction, the transaction log manager 137 writes/stores the log data directly into the allocated portion of the log buffer 143, 145 utilizing an RDMA write operation.

Figure 4:
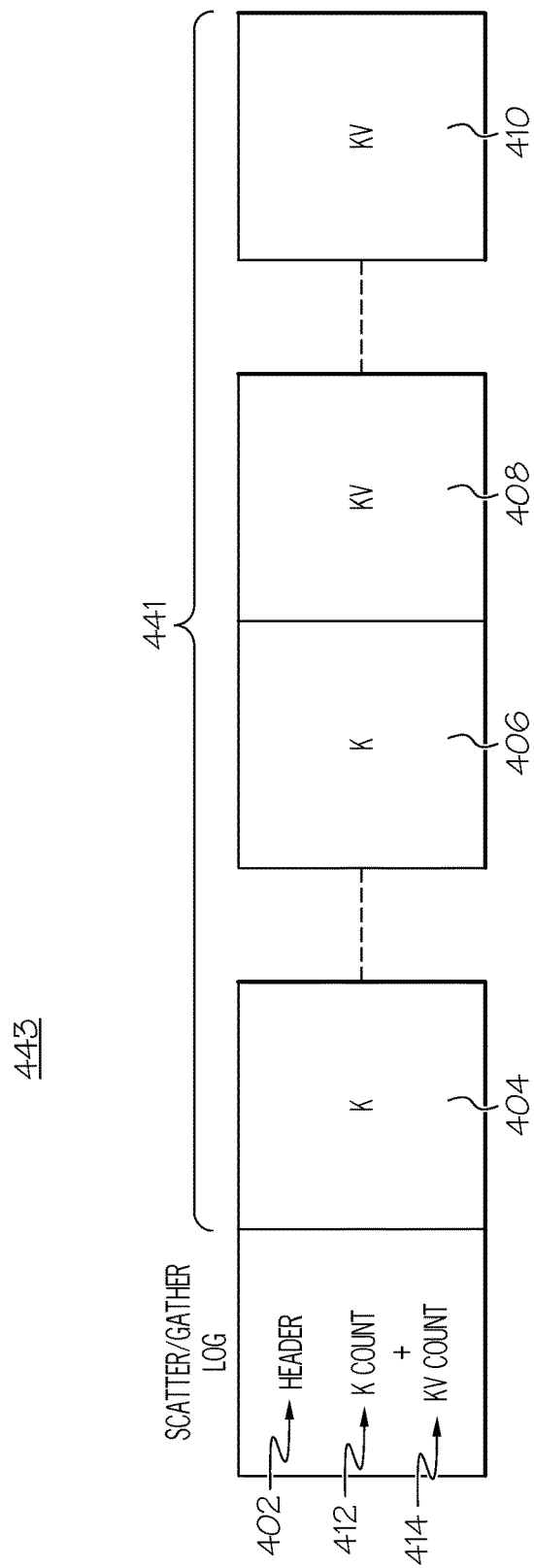
FIG. 4 shows one example of an allocated portion of a log buffer after log data has been stored therein according to one embodiment of the present disclosure.

FIG. 4 shows one example of an allocated portion of a log buffer 443 after the transaction log manager 137 has stored log data 441 therein. In this example, the log data 141 comprises a read set and a write set for a key value store. A read set comprises all of the key values that have been generated by the client 102. The write set comprises all of the keys that have been modified by the client 102. In another example implementing a KVS the log data 141 can comprise the modification that has been applied and the version number of the key that has been read. As shown in FIG. 4, the log buffer 443 comprises, for example, a header 402 and the log data 441, which is stored in a contiguous block(s) of memory 404, 406, 408, 410. The header 402 at least comprises an indication of the size of the log data 441 stored within the entry of the buffer 441. For example, FIG. 4 shows that the header 402 comprises a read set count 412 and a write set count 414.

Once the transaction log manager 137 has written the log data 141 to its pre-allocated portion of the log buffer 143, 145, the sequence generator 116 sends the COMMIT message to the server(s) 106, 108. However, in another embodiment, the sequence generator 116 does not wait for the log data write operation to complete before sending the transaction COMMIT message to the server(s) 106, 108. For example, the transaction log manager asynchronously sends the log data 141 to the servers, and the sequence generator 116 sends a synchronous the COMMIT message to the server(s) 106, 108. The sequence generator 116 does not need to wait for the log data write operation to complete before sending the COMMIT message since the log data 141 and the message are being sent over the same channel between the client 102 and server 106, 108. The server 106, 108 does not handle the COMMIT message until the RDMA write operation has completed since the commit message is received after the RDMA write on the same serialized sequential channel. The transaction COMMIT message notifies the server(s) 106, 108 that log data 141 has been stored within its log buffer 143, 145 for the transaction. The transaction manager 118, 120 of the server(s) 106, 108 then access its log buffer 143, 145 and replaces entries in the main map 128 with the corresponding entries in the log data 141, as discussed above with respect to FIG. 3.

The transactional logging operations of one or more embodiments are advantageous the transaction log data 141 is directly written to the log buffer 143, 145 on a transaction server 106. Therefore, the server 106 is able to operate on the log data 141 without needing to de-serialize the data or perform any additional transformations on the log data. In addition, the processor(s) of the client systems 102, 104 are not required to be involved in the collection and distribution of the transaction logs. For example, a client processor is not required to copy transaction or serialize a transaction log during a collection process since a hardware scatter/gather operation is performed. Also, the client processor is not required to distribute transaction logs since RMDA operations are utilized. These RDMA operations allow transaction distribution to be executed asynchronously, which improves concurrency. Another advantage is that the processor(s) of the servers 106, 108 are not required to be involved in the processing of the communications related to transaction logs. Client and server CPU cycles can be further allocated to other processes/events, which reduces latency and increases the throughput of the overall system.

Operational Flow Diagrams

Figure 5:
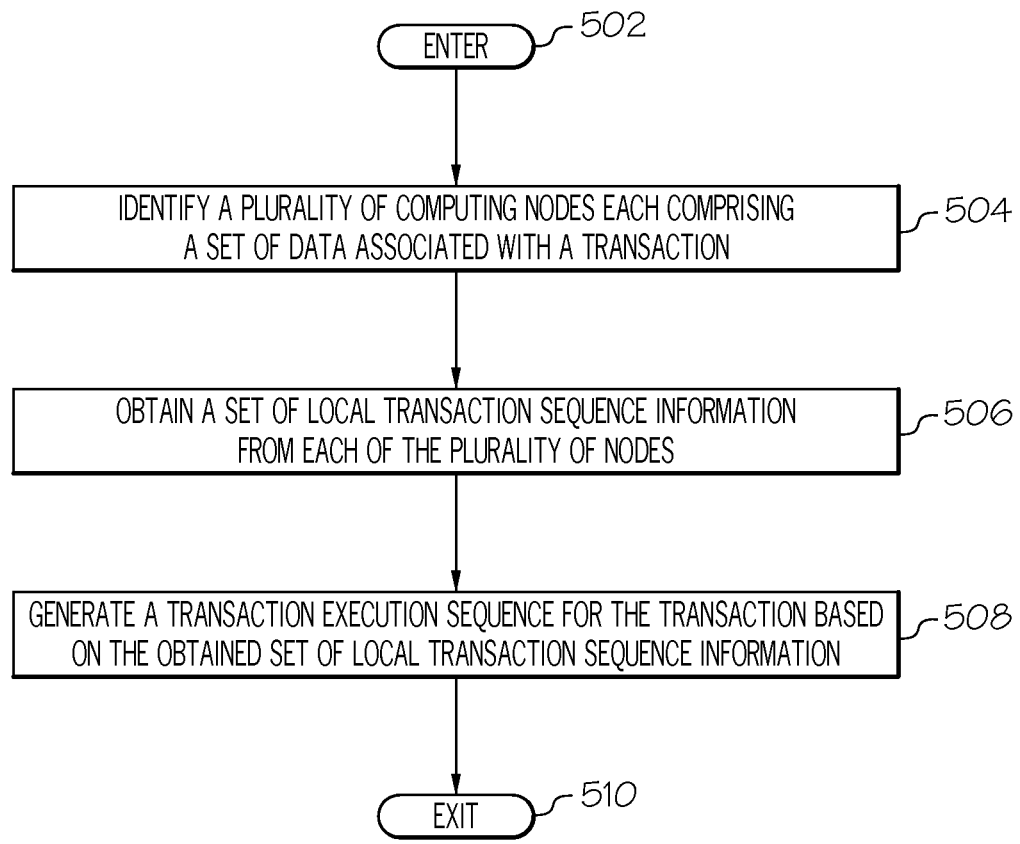
FIG. 5 is an operational flow diagram illustrating one example of generating transaction sequences for ordering the execution of a transaction in a distributed computing environment.

FIG. 5 is an operational flow diagram illustrating one example of generating transaction sequences for ordering the execution of a transaction in a distributed computing environment. The operational flow diagram of FIG. 5 begins at step 502 and flows directly to step 504. The sequencer 114, at step 504, identifies a plurality of computing nodes 106, 108 each comprising a set of data 124, 126 associated with a transaction. The sequencer 114, at step 506, obtains a set of local transaction sequence information 140 from each of the plurality of computing nodes 106, 108. The set of local transaction sequence information 140 identifies an available transaction sequence number for the computing node 106, 108 comprising the information 140. The sequencer 114, at step 508, generates, based on obtaining the set of local transaction sequence information 140, a transaction sequence 133 for the transaction. The transaction sequence 133 orders an execution of the transaction on each of the plurality of computing nodes 106, 108 with respect to other transactions. The control flow exits at step 510.

Figure 6:
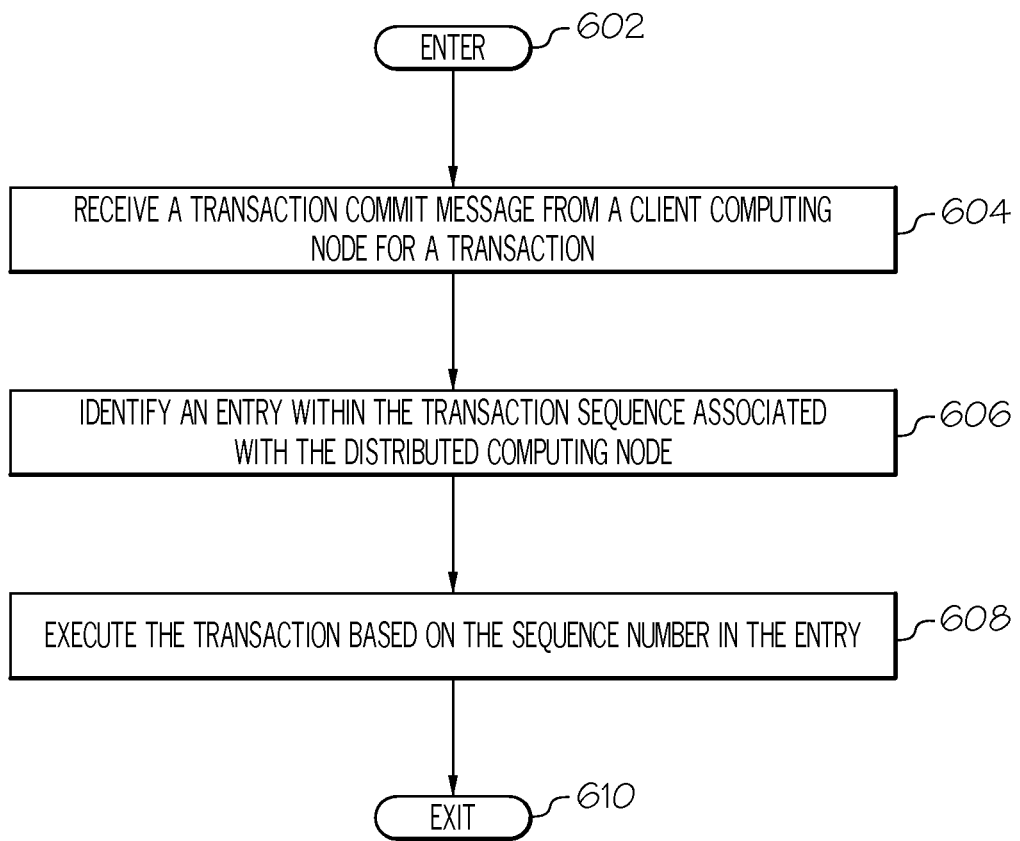
FIG. 6 is an operational flow diagram illustrating one example of executing a transaction in a distributed computing environment based on a transaction execution sequence associated with the transaction according to one embodiment of the present disclosure.

FIG. 6 is an operational flow diagram illustrating one example of executing a transaction in a distributed computing environment based on a transaction execution sequence generated for the transaction. The operational flow diagram of FIG. 6 begins at step 602 and flows directly to step 604. The sequencer 114, at step 604, receives a transaction commit message from a client computing node 102 for a transaction. The transaction commit message comprises at least an identifier of the transaction and a transaction sequence 133 for the transaction. The transaction sequence 133 indicating a sequence of execution for the transaction on a plurality of distributed computing nodes. The sequencer 114, at step 606, identifies an entry within the transaction sequence 133 associated with a given distributed computing node 106. The entry comprises a sequence number for executing the transaction on the given distributed computing node 106 with respect to other transactions. The transaction, at step 608, is executed on the distributed computing node 106 based on the sequence number in the entry. The control flow exits at step 610.

Figure 7:
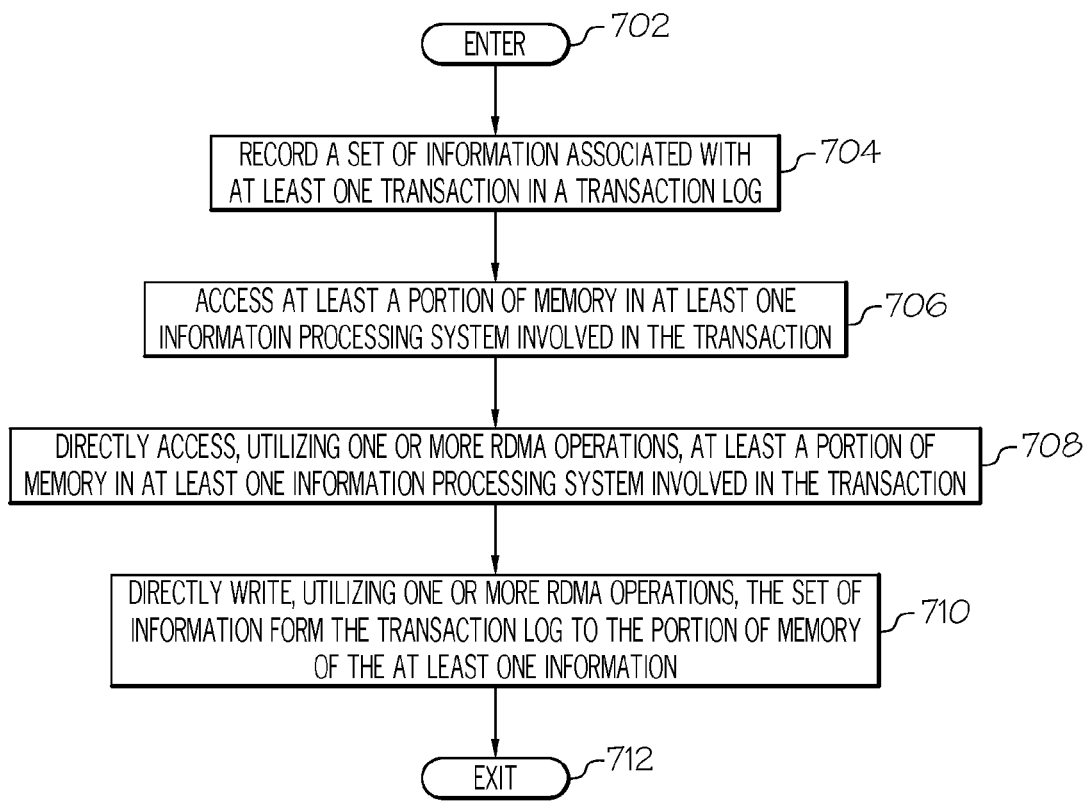
FIG. 7 is an operational flow diagram illustrating one example of logging transactions in a distributed computing environment.

FIG. 7 is an operational flow diagram illustrating one example of logging transactions in a distributed computing environment. The operational flow diagram of FIG. 7 begins at step 702 and flows directly to step 704. The transaction manager 137, at step 704, records a set of information (e.g., transaction/log data 139) associated with at least one transaction in a transaction log 141. The transaction manager 137, at step 706, accesses at least a portion of memory (e.g., allocation portion of a log buffer 143) in at least one information processing system 106 involved in the transaction. The portion of memory being directly accessed without involving a processor of the at least one information processing system 106. For example, one or more RDMA operations are used to directly access the portion of memory.

The transaction manager 137, at step 708, writes the set of information from the transaction log 141 to the portion of memory. The set of information being directly written to the portion of memory without involving a processor of the at least one information processing system 106. For example, the transaction manager 137 stores the set of information from the transaction log 141 in a contiguous data structure of the portion of memory, the contiguous data structure comprising a size of a read set and a write set, and keys of the read set and key-value pairs of the write set. In one embodiment, an RDMA operation(s) is utilized to directly write the set of information to the portion of memory. The control flow exits at step 710

Information Processing System

Figure 8:
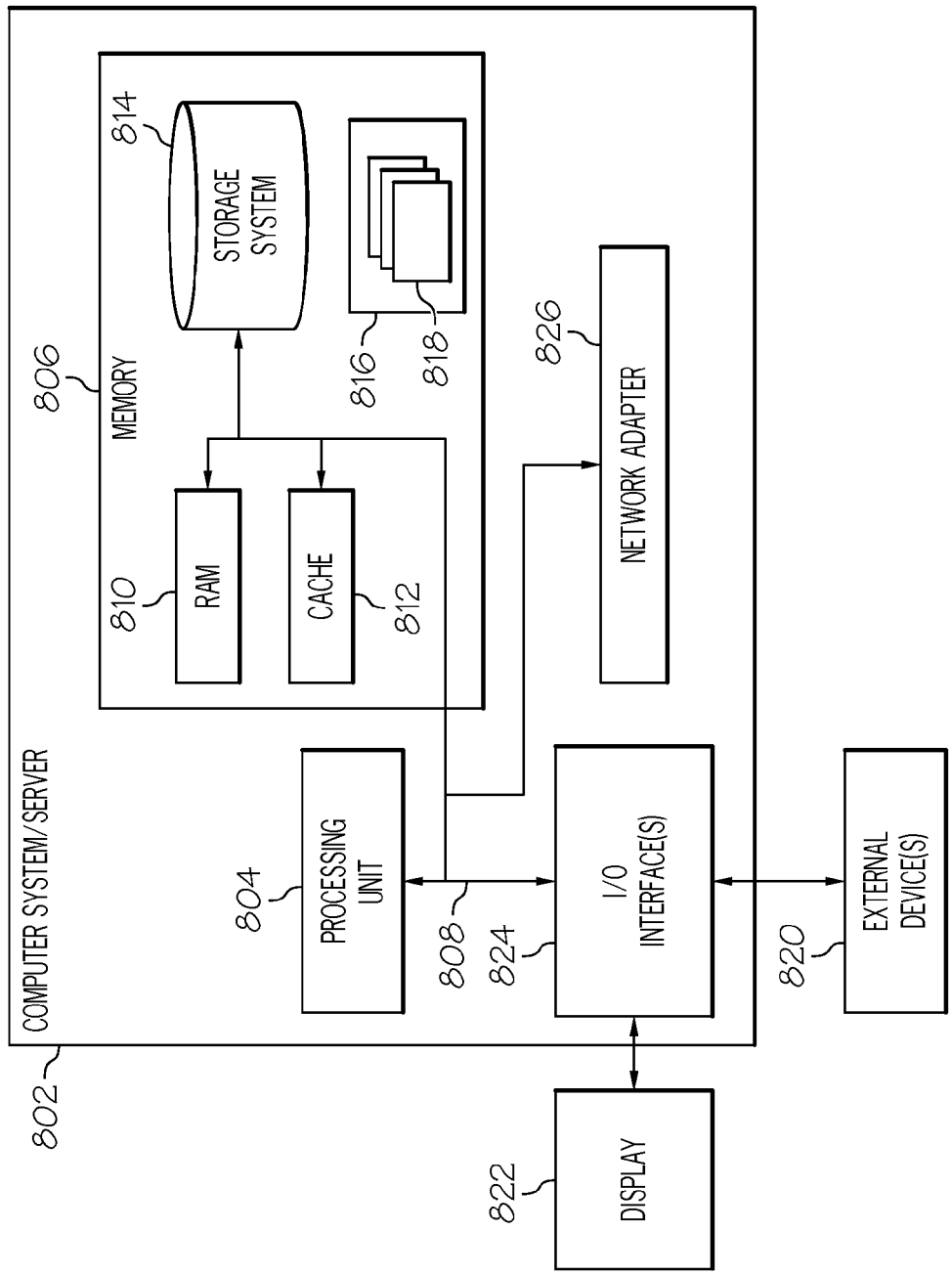
FIG. 8 is a block diagram illustrating one example of an information processing system according to one embodiment of the present disclosure.

Referring now to FIG. 8, this figure is a block diagram illustrating an information processing system, such as the client node 102 or distributed computing node 106 shown in FIG. 1, which can be utilized in various embodiments of the present disclosure. The information processing system 802 is based upon a suitably configured processing system configured to implement one or more embodiments of the present disclosure. Any suitably configured processing system can be used as the information processing system 802 in embodiments of the present disclosure. The components of the information processing system 802 can include, but are not limited to, one or more processors or processing units 804, a system memory 806, and a bus 808 that couples various system components including the system memory 806 to the processor 804.

Although not shown in FIG. 8, the components the client nodes 102, 104 or the distributed computing nodes 106, 108, 110 discussed above with respect to FIG. 1 can reside within the main memory 806 and/or the processor 804. These components can also be a separate hardware component as well.

The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 808 can also include computer system readable media in the form of volatile memory, such as random access memory (RAM) 810 and/or cache memory 812. The information processing system 802 can further include other removable/non-removable, volatile/non-volatile computer system storage media. By way of example only, a storage system 814 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 806 can include at least one program product having a set of program modules that are configured to carry out the functions of an embodiment of the present disclosure.

Program/utility 816, having a set of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the present disclosure.

The information processing system 802 can also communicate with one or more external devices 820 such as a keyboard, a pointing device, a display 822, etc.; one or more devices that enable a user to interact with the information processing system 802; and/or any devices (e.g., network card, modem, etc.) that enable computer system/server 802 to communicate with one or more other computing devices. Such communication can occur via I/O interfaces 824. Still yet, the information processing system 802 can communicate with one or more networks such as a local area network (LAN), a general wide area network (WAN), and/or a public network (e.g., the Internet) via network adapter 826. As depicted, the network adapter 826 communicates with the other components of information processing system 802 via the bus 808. Other hardware and/or software components can also be used in conjunction with the information processing system 802. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with a distributed computing node in a plurality of distributed computing nodes, for logging transactions in a distributed processing system, the method comprising:
    accessing a plurality of data sets associated with a transaction, wherein each information processing system of a plurality of information processing systems maintains a different data set of the plurality of data sets, where each information processing of the plurality of information processing systems is involved in the transaction, and wherein each information processing system of the plurality of information processing systems is separate and distinct from the distributed computing node;
    creating a local copy of data for each data set of the plurality of data sets;
    recording a set of information associated with the transaction in a transaction log stored at the distributed computing node, the transaction having been performed by the distributed computing node across each local copy of data created for each data set of the plurality of data sets, and where the set of information and the transaction log are separate and distinct from the local copy of data created for each data set of the plurality of data sets;
    accessing, for each local copy of data, at least a portion of memory in the information processing system involved in the transaction and comprising the data set corresponding to the local copy of data operated on by the transaction, the memory configured to store log data associated with one or more transactions, and where the at least a portion of memory is private to the distributed computing node, the portion of memory being directly accessed without involving a processor of the at least one information processing system;
    writing, prior to sending a transaction commit message to each information processing system of the plurality of information processing systems, the set of information from the transaction log to the portion of memory of each information processing system of the plurality of information processing systems, wherein the set of information is directly written to the portion of memory without involving a processor of the information processing system of the plurality of information processing systems, and wherein the set of information configures each of the information processing systems of the plurality of information processing systems to perform one or more operations on the data set according to the transaction;
    generating a transaction sequence for the transaction, the transaction sequence comprising a separate transaction sequence number for each information processing system of the plurality of information processing systems instructing each information processing system when to perform the transaction in relation to operations of other transactions associated with the information processing system; and
    sending the transaction sequence for the transaction to each information processing system of the plurality of information processing systems.

2. The method of claim 1, wherein the set of information comprises data associated with the transaction after one or more transaction operations have been performed thereon.

3. The method of claim 1, wherein the portion of memory is private to the distributed computing node.

4. The method of claim 1, further comprising:
    gathering the set of information from non-continuous blocks of memory; and
    storing the set of information in a scatter/gather list.

5. The method of claim 1, further comprising:
    sending a transaction commit message to the one or more information processing systems, wherein the transaction commit message notifies the one or more information processing systems that the set of information associated with the transaction has been stored within the portion of memory.

6. The method of claim 1, further comprising:
    creating a local copy of a set of transaction data associated with the at least one transaction from the one or more information processing systems; and
    performing one or more transaction operations on the local copy of the set of transaction data,
    wherein the set of information is recorded based on performing the one or more transaction operations.

7. The method of claim 1, wherein writing set of information comprises keys of a read set and key-value pairs of a write set associated with the transaction, and wherein writing the set of information from the transaction log to portion of memory comprises
    storing the set of information from the transaction log in a contiguous data structure of the portion of memory, the contiguous data structure comprising a size of the read set and the write set, and the keys of the read set and the key-value pairs of the write set.

8. A distributed processing node for logging transactions in a distributed processing system, the distributed processing node comprising:
    memory;
    a processor communicatively coupled to the memory;
    a transaction log manager communicatively coupled to the memory and the processor, the transaction log manager configured to perform:
        recording a set of information associated with a transaction in a transaction log stored at the distributed processing node, the transaction having been performed by the distributed processing node on a local copy of data, and where the set of information and the transaction log are separate and distinct from the local copy of data;
        accessing at least a portion of memory in a plurality of information processing systems involved in the transaction, the memory configured to store log data associated with one or more transactions, where each information processing system of the plurality of information processing systems is separate and distinct from the distributed processing node and comprises at least a portion of data corresponding to the local copy of data operated on by the transaction, and where the at least a portion of memory is private to the information processing system of the plurality of information processing systems, the portion of memory being directly accessed without involving a processor of each information processing system of the plurality of information processing systems; and
        writing, prior to sending a transaction commit message to each information processing system of the plurality of information processing systems, the set of information from the transaction log to the portion of memory, wherein the set of information being directly written to the portion of memory without involving a processor of each information processing system of the plurality of information processing systems, and wherein the set of information configures each information processing system of the plurality of information processing systems to perform one or more operations on the at least a portion of data according to the transaction; and a transaction sequencer communicatively coupled to the memory and the processor, the transaction sequencer configured to perform:
generating a transaction sequence for the transaction, the transaction sequence comprising a separate transaction sequence number for each information processing system of the plurality of information processing systems instructing each information processing system when to perform the transaction in relation to operations of other transactions associated with the information processing system, wherein at least two of the separate transaction sequence numbers differ from each other; and
sending the transaction sequence for the transaction to each information processing system of the plurality of information processing systems.

9. The distributed processing node of claim 8, wherein the set of information comprises data associated with the transaction after one or more transaction operations have been performed thereon.

10. The distributed processing node of claim 8, wherein the portion of memory of each information processing system of the plurality of information processing systems is private to the distributed processing system.

11. The distributed processing node of claim 8, wherein the method further comprises:
gathering the set of information from non-continuous blocks of memory; and
storing the set of information in a scatter/gather list.

12. The distributed processing node of claim 8, wherein the method further comprises:
sending a transaction commit message to each information processing system of the plurality of information processing systems, wherein the transaction commit message notifies each information processing system that the set of information associated with the transaction has been stored within the portion of memory.

13. The distributed processing node of claim 8, wherein the method further comprises:
creating a local copy of a set of transaction data associated with the transaction each information processing system of the plurality of information processing systems; and
performing one or more transaction operations on the local copy of the set of transaction data,
wherein the set of information is recorded based on performing the one or more transaction operations.

14. A computer program product for logging transactions in a distributed processing system, the computer program product comprising:
a non-transitory storage medium readable by a processing circuit of a distributed computing node in a plurality of distributed computing nodes, and storing instructions which, responsive to being executed by the processing circuit, cause the processing circuit to perform operations comprising:
accessing a plurality of data sets associated with a transaction, wherein each information processing system of a plurality of information processing systems maintains a different data set of the plurality of data sets, where each information processing of the plurality of information processing systems is involved in the transaction, and wherein each information processing system of the plurality of information processing systems is separate and distinct from the distributed computing node;
creating a local copy of data for each data set of the plurality of data sets;
recording a set of information associated with the transaction in a transaction log stored at the distributed computing node, the transaction having been performed by the distributed computing node across each local copy of data created for each data set of the plurality of data sets, and where the set of information and the transaction log are separate and distinct from the local copy of data created for each data set of the plurality of data sets;
accessing, for each local copy of data, at least a portion of memory in the information processing system involved in the transaction and comprising the data set corresponding to the local copy of data operated on by the transaction, the memory configured to store log data associated with one or more transactions, and where the at least a portion of memory is private to the distributed computing node, the portion of memory being directly accessed without involving a processor of the at least one information processing system;
writing, prior to sending a transaction commit message to each information processing system of the plurality of information processing systems, the set of information from the transaction log to the portion of memory of each information processing system of the plurality of information processing systems, wherein the set of information is directly written to the portion of memory without involving a processor of the information processing system of the plurality of information processing systems, and wherein the set of information configures each of the information processing systems of the plurality of information processing systems to perform one or more operations on the data set according to the transaction;
generating a transaction sequence for the transaction, the transaction sequence comprising a separate transaction sequence number for each information processing system of the plurality of information processing systems instructing each information processing system when to perform the transaction in relation to operations of other transactions associated with the information processing system; and
sending the transaction sequence for the transaction to each information processing system of the plurality of information processing systems.

15. The computer program product of claim 14, wherein the set of information comprises data associated with the transaction after one or more transaction operations have been performed thereon.

16. The computer program product of claim 14, wherein the portion of memory is private to the distributed computing node.

17. The computer program product of claim 14, wherein the set of operations further comprises:

gathering the set of information from non-continuous blocks of memory; and storing the set of information in a scatter/gather list.

18. The computer program product of claim 14, wherein the set of operations further comprises:

sending a transaction commit message to the one or more information processing systems, wherein the transaction commit message notifies the one or more information processing systems that the set of information associated with the transaction has been stored within the portion of memory.

19. The computer program product of claim 14, wherein the set of operations further comprises:

creating a local copy of a set of transaction data associated with the transaction from the one or more information processing systems; and performing one or more transaction operations on the local copy of the set of transaction data, wherein the set of information is recorded based on performing the one or more transaction operations.

20. The computer program product of claim 14, wherein writing set of information comprises keys of a read set and key-value pairs of a write set associated with the transaction, and wherein writing the set of information from the transaction log to portion of memory comprises storing the set of information from the transaction log in a contiguous data structure of the portion of memory, the contiguous data structure comprising a size of the read set and the write set, and the keys of the read set and the key-value pairs of the write set.

* * * * *